(12) United States Patent
Adamczyk et al.

(10) Patent No.: US 9,295,935 B1
(45) Date of Patent: Mar. 29, 2016

(54) INFLATOR WITH DIRECTIONAL FLOW SEPARATION DISC

(71) Applicant: TRW Vehicle Safety Systems Inc., Washington, MI (US)

(72) Inventors: Patrick R. Adamczyk, Gilbert, AZ (US); Manesh Parshotam, San Tan Valley, AZ (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 0 days.

(21) Appl. No.: 14/523,965

(22) Filed: Oct. 27, 2014

(51) Int. Cl.
| | | |
|---|---|---|
| *B60R 21/263* | (2011.01) | |
| *B01D 46/00* | (2006.01) | |
| *B60R 21/26* | (2011.01) | |
| *B60R 21/264* | (2006.01) | |
| *B60R 21/268* | (2011.01) | |
| *B60R 21/217* | (2011.01) | |

(52) U.S. Cl.
CPC .......... *B01D 46/0097* (2013.01); *B60R 21/263* (2013.01); *B60R 21/2171* (2013.01); *B60R 2021/26011* (2013.01); *B60R 2021/2633* (2013.01); *B60R 2021/2642* (2013.01); *B60R 2021/2685* (2013.01)

(58) Field of Classification Search
CPC ................... B60R 21/2171; B60R 2021/2642; B60R 2021/2685; B60R 2021/2633
See application file for complete search history.

(56) References Cited

U.S. PATENT DOCUMENTS

| | | | | | |
|---|---|---|---|---|---|
| 5,899,492 | A | * | 5/1999 | Okada et al. .................. | 280/736 |
| 5,934,705 | A | * | 8/1999 | Siddiqui et al. ............... | 280/736 |
| 6,142,515 | A | * | 11/2000 | Mika .............................. | 280/736 |
| 6,244,623 | B1 | * | 6/2001 | Moore et al. .................. | 280/737 |
| 6,314,888 | B1 | * | 11/2001 | Muller et al. ................. | 102/530 |
| 6,315,322 | B1 | * | 11/2001 | Mika .............................. | 280/736 |
| 6,481,357 | B1 | * | 11/2002 | Lindner et al. ................ | 102/530 |
| 6,543,805 | B2 | * | 4/2003 | McFarland et al. ........... | 280/736 |
| 7,343,862 | B2 | * | 3/2008 | McCormick .................. | 102/530 |
| 7,556,289 | B2 | * | 7/2009 | Katsuda et al. ............... | 280/736 |
| 7,712,778 | B2 | * | 5/2010 | Smith et al. ................... | 280/736 |
| 8,028,627 | B2 | * | 10/2011 | Zhang ............................ | 102/530 |
| 8,444,179 | B2 | * | 5/2013 | McFarland .................... | 280/736 |
| 8,556,294 | B1 | * | 10/2013 | Norman, III .................. | 280/741 |
| 8,827,308 | B1 | * | 9/2014 | Lewis et al. ................... | 280/736 |

FOREIGN PATENT DOCUMENTS

DE    102011103764 A1 * 12/2012
WO    WO 2009043690 A1 *  4/2009

* cited by examiner

*Primary Examiner* — Nicole Verley
(74) *Attorney, Agent, or Firm* — Tarolli, Sundheim, Covell & Tummino LLP

(57) ABSTRACT

An inflator (40) for inflating an inflatable vehicle occupant protection device includes a primary stage (50) actuatable to produce a primary flow of inflation fluid, a secondary stage (100) actuatable to produce a secondary flow of inflation fluid, and a filter chamber (150) into which the primary and secondary flows of inflation fluid are directed. The inflator (40) also includes a secondary filter assembly (120) that permits the secondary flow of inflation fluid to flow into the filter chamber (150) and blocks particulates from flowing from the filter chamber into the secondary stage (100).

21 Claims, 6 Drawing Sheets

US 9,295,935 B1

INFLATOR WITH DIRECTIONAL FLOW SEPARATION DISC

TECHNICAL FIELD

The invention relates to an inflator for providing inflation fluid for inflating an inflatable vehicle occupant protection device.

BACKGROUND OF THE INVENTION

It is known to provide an inflator for inflating an inflatable vehicle occupant protection device. One particular type of inflator uses a solid propellant to generate inflation fluid. The solid propellant, when ignited, produces inflation fluid for inflating the protection device. Upon actuation, the inflation fluid is discharged from the inflator through an inflation fluid outlet, and the inflation fluid is directed into the protection device.

Solid propellant inflators can be two-stage inflators in which two separate stages are individually actuatable to produce inflation fluid. A first or primary stage is configured as a primary source of inflation fluid. A second or secondary stage is configured as a secondary source of inflation that can supplement the primary stage. The primary stage can be actuatable any time a vehicle collision sensor determines a collision of a predetermined severity. The secondary stage can be selectively actuatable depending on sensed vehicle and/or occupant conditions, such as a seat position, seatbelt buckle latched/unlatched condition, sensed seat weight, and collision severity. When actuated, the secondary stage supplements the inflation fluid delivered to the protection device by the primary stage.

Two-stage inflators can include a housing with a primary chamber containing a primary propellant and a secondary chamber containing a secondary propellant. The primary and secondary propellants are ignitable via respective primary and secondary ignitors, which are operatively connected to a controller that determines whether to actuate the primary stage alone, or the primary and secondary stages together.

The primary and secondary chambers can be connected to a discharge chamber through which the inflation fluid generated by the primary and/or secondary stages is discharged to the protection device. To prevent the ignition of the primary stage from unintentionally igniting the secondary stage due to hot particles passing through the discharge chamber, blocking means, such as a wall or membrane, can be used to divide the discharge chamber into separate portions associated with the primary and secondary stages, respectively. This configuration, however, can complicate construction of the inflator by introducing additional manufacturing steps and requiring the addition of components, such as particulate filters.

SUMMARY OF THE INVENTION

In one aspect, the invention relates to an inflator for inflating an inflatable vehicle occupant protection device includes a primary stage actuatable to produce a primary flow of inflation fluid, a secondary stage actuatable to produce a secondary flow of inflation fluid, and a filter chamber into which the primary and secondary flows of inflation fluid are directed. The inflator also includes a secondary filter assembly that permits the secondary flow of inflation fluid to flow into the filter chamber and blocks particulates from flowing from the filter chamber into the secondary stage.

According to another aspect, alone or in combination with any of the preceding aspects, the primary and secondary stages occupy portions of an inflator housing. The filter chamber is positioned between the primary and secondary stages. The secondary filter assembly defines the boundary between the secondary stage and the filter chamber.

According to another aspect, alone or in combination with any of the preceding aspects, the inflator can include a housing having a cylindrical outer wall extending along a central inflator axis. The primary stage can occupy a first axial end portion of the housing. The secondary stage can occupy an opposite second axial end portion of the housing. The filter chamber can occupy the space that extends axially between the primary and secondary stages.

According to another aspect, alone or in combination with any of the preceding aspects, the primary stage can include a primary propellant chamber and the secondary stage can include a secondary propellant chamber. The filter chamber can be positioned between the primary and secondary propellant chambers. The secondary filter assembly can separate the secondary propellant chamber from the filter chamber.

According to another aspect, alone or in combination with any of the preceding aspects, the filter chamber can include outlets through which the inflation fluid exits the inflator.

According to another aspect, alone or in combination with any of the preceding aspects, the secondary filter assembly can include a secondary filter disc and a flow control disc. The secondary filter disc can define the boundary between the secondary stage and the filter chamber and can include one or more openings that provide fluid communication between the secondary stage and the filter chamber. The flow control disc can block fluid communication between the filter chamber and the secondary stage through the openings in response to actuation of the primary stage. The flow control disc can become at least one of deformed, displaced, and deflected in response to actuation of the secondary stage to establish fluid communication between the secondary stage and the filter chamber via the openings.

According to another aspect, alone or in combination with any of the preceding aspects, the flow control disc can have a generally circular configuration with a central portion and an outer portion that encircles the central portion, the outer portion being configured to coincide with the locations of the openings in the secondary filter disc.

According to another aspect, alone or in combination with any of the preceding aspects, the outer portion can have a domed torroidal configuration that forms a torroidal domed space that covers openings.

According to another aspect, alone or in combination with any of the preceding aspects, the flow control disc can be secured to the secondary filter disc on a surface of the flow control disc that is presented toward the filter chamber. Fluid pressure in the filter chamber resulting from actuation of the primary stage can act on the outer portion and urges the flow control disc against the secondary filter disc to block fluid communication between the secondary stage and the filter chamber. Fluid pressure in the secondary stage resulting from actuation of the secondary stage can act on the outer portion through the openings in the secondary filter disc to at least one of deform, displace, and deflect the flow control disc to establish fluid communication between the secondary stage and the filter chamber.

According to another aspect, alone or in combination with any of the preceding aspects, the central portion of the flow control disc can be connected to the secondary filter disc. Pressure resulting from actuation of the secondary stage can act on the outer portion through the openings in the secondary filter disc causing the flow control disc to become at least one of deformed, displaced, and deflected at the interface between the outer portion and the central portion of the flow control disc to establish an opening about the periphery of the flow control disc through which secondary inflation fluid can flow into the filter chamber.

According to another aspect, alone or in combination with any of the preceding aspects, the central portion of the flow control disc can include an opening, and the flow control disc can include a peripheral portion, radially outside the outer portion, that is connected to the secondary filter disc. Pressure resulting from actuation of the secondary stage can act on the outer portion through the openings in the secondary filter disc causing the flow control disc to become at least one of deformed, displaced, and deflected at the interface between the outer portion and the peripheral portion of the flow control disc to move the central portion away from the secondary filter disc to thereby establish flow path through the openings in the secondary filter disc and the opening in the central portion of the flow control disc through which secondary inflation fluid can flow into the filter chamber.

According to another aspect, alone or in combination with any of the preceding aspects, the flow control disc can have a generally flat configuration and can be secured to the secondary filter disc on a surface of the flow control disc that is presented toward the filter chamber. Fluid pressure in the filter chamber resulting from actuation of the primary stage can act on the flow control disc to maintain its connection to the secondary filter disc to block fluid communication between the secondary stage and the filter chamber. Fluid pressure in the secondary stage resulting from actuation of the secondary stage can act on the flow control disc to break the connection of the flow control disc to the secondary filter disc to at least one of deform, displace, and deflect the flow control disc to establish fluid communication between the secondary stage and the filter chamber.

According to another aspect, alone or in combination with any of the preceding aspects, the flow control disc can be connected to the filter disc by tape. Pressure resulting from actuation of the secondary stage acting on the flow control disc can cause the tape to at least one of rupture and disconnect, thereby allowing the flow control disc to become displaced to unblock the openings in the secondary filter disc and permit secondary inflation fluid to flow through the openings in the secondary filter disc into the filter chamber.

According to another aspect, alone or in combination with any of the preceding aspects, a filter disc assembly for preventing products resulting from the ignition of a gas generating material of a primary stage of an inflator from entering a secondary stage of the inflator can include a filter disc for being positioned between the primary stage and the secondary stage. The filter disc can include one or more openings in fluid communication with the secondary stage and through which secondary inflation fluid products can flow upon actuation of the secondary stage. The filter disc assembly can also include a flow control disc positioned on a surface of the filter disc presented toward the primary stage and blocking fluid communication with the secondary stage through the openings in the filter disc. Primary inflation fluid resulting from actuation of the primary stage can urge the flow control disc against the filter disc to maintain the blocking of fluid communication with the secondary stage through the openings in the filter disc. Secondary inflation fluid resulting from actuation of the secondary stage can act on the flow control disc through the openings to at least one of deform, displace, and deflect the flow control disc to unblock the openings and permit the secondary inflation fluid to flow through the openings in the filter disc.

According to another aspect, alone or in combination with any of the preceding aspects, the flow control disc can have a generally circular configuration with a central portion and an outer portion that encircles the central portion. The outer portion can be configured to coincide with the locations of the openings in the filter disc.

According to another aspect, alone or in combination with any of the preceding aspects, the outer portion can have a domed torroidal configuration that forms a torroidal domed space that covers openings.

According to another aspect, alone or in combination with any of the preceding aspects, the flow control disc can be secured to the filter disc. Fluid pressure resulting from actuation of the primary stage can act on the outer portion and urge the flow control disc against the filter disc to block fluid communication with the secondary stage via the openings in the filter disc. Fluid pressure in the secondary stage resulting from actuation of the secondary stage can act on the outer portion through the openings in the filter disc to at least one of deform, displace, and deflect the flow control disc to unblock fluid communication with the secondary stage via the openings in the filter disc.

According to another aspect, alone or in combination with any of the preceding aspects, the central portion of the flow control disc can be connected to the filter disc. Pressure resulting from actuation of the secondary stage can act on the outer portion through the openings in the filter disc causing the flow control disc to become at least one of deformed, displaced, and deflected at the interface between the outer portion and the central portion of the flow control disc to establish an opening about the periphery of the flow control disc through which secondary inflation fluid can flow.

According to another aspect, alone or in combination with any of the preceding aspects, the central portion of the flow control disc can include an opening, and the flow control disc further can include a peripheral portion radially outside the outer portion that is connected to the filter disc. Pressure resulting from actuation of the secondary stage acting on the outer portion through the openings in the filter disc can cause the flow control disc to become at least one of deformed, displaced, and deflected at the interface between the outer portion and the peripheral portion of the flow control disc to move the central portion away from the filter disc to thereby establish flow path through the openings in the filter disc and the opening in the central portion of the flow control disc through which secondary inflation fluid can flow.

According to another aspect, alone or in combination with any of the preceding aspects, the flow control disc can have a generally flat configuration. Fluid pressure in the filter chamber resulting from actuation of the primary stage can act on the flow control disc to maintain its connection to the filter disc to block fluid communication with the secondary stage through the openings in the filter disc. Fluid pressure in the secondary stage resulting from actuation of the secondary stage can act on the flow control disc to break the connection of the flow control disc to the filter disc to at least one of deform, displace, and deflect the flow control disc to establish fluid communication with the secondary stage through the openings in the filter disc.

According to another aspect, alone or in combination with any of the preceding aspects, the flow control disc can be connected to the filter disc by tape. Pressure resulting from actuation of the secondary stage acting on the flow control disc can cause the tape to at least one of rupture and disconnect, thereby allowing the flow control disc to become displaced to unblock the openings in the filter disc and permit secondary inflation fluid to flow through the openings in the filter disc.

BRIEF DESCRIPTION OF THE DRAWINGS

The foregoing and other features of the invention will become apparent to those skilled in the art to which the invention relates upon reading the following description with reference to the accompanying drawings, in which.

DESCRIPTION OF EMBODIMENTS

The invention relates to an apparatus for helping to protect an occupant of a vehicle. Representative of the invention, an apparatus 10 in the form of an inflator serves as an inflation fluid source that is actuatable to provide inflation fluid for inflating an inflatable vehicle occupant protection device (not shown). The inflatable vehicle occupant protection device can be any protection device that requires inflation, such as an inflatable air bag, an inflatable curtain, an inflatable seat belt, an inflatable knee bolster, an inflatable headliner, a knee bolster operated by an inflatable air bag, or any other vehicle occupant protection device that requires inflation.

Figure 2A:
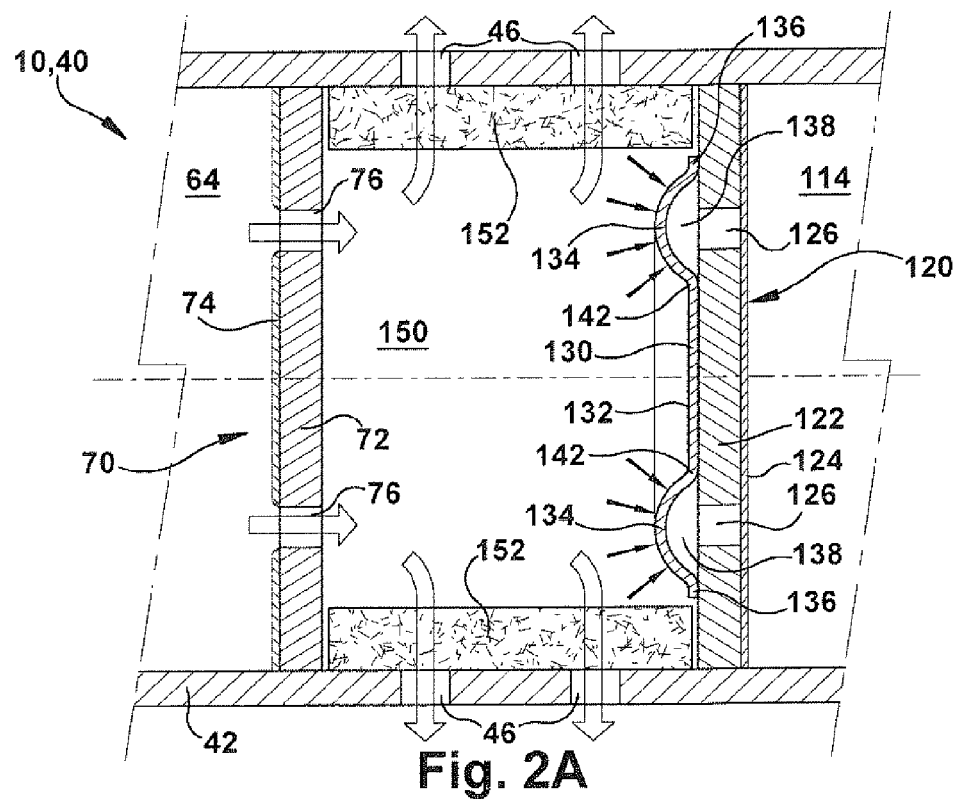
FIG. 2A is a sectional view illustrating a portion of an inflator of the apparatus of FIG. 1 in a non-actuated condition, according to a first embodiment of the invention.

The inflator 40 may be configured in a variety of manners. An example configuration of the inflator 40 is shown in FIG. 2A. In the example of FIG. 2A, the inflator 40 is a two-stage inflator including a primary stage 50 and a secondary stage 100. The inflator 40 includes an elongated cylindrical sidewall 42 that is closed at one end by a primary end cap 52 and at the opposite end by a secondary end cap 102. The sidewall 42 and end caps 52, 102 define a closed, sealed chamber 44 for housing inflation fluid generating materials, such as solid propellant pellets 66.

The sidewall 42 and end caps 52, 102 are constructed of a high strength material, such as tubular steel, aluminum, or other suitable metals or metal alloys. The end caps 52, 102 can be formed in any suitable manner, such as by machining or stamping the end cap from a single piece of material. The end caps 52, 102 can be secured to the sidewall 42 by known means, such as welding. The weld can be formed, for example, via a friction weld, butt weld, or TIG weld. The sidewall 42 and end caps 52, 102 are centered on a longitudinal axis 12 of the inflator 40.

The primary end cap 52 includes a central opening that supports an initiator assembly 54. The initiator assembly 54 includes an initiator 56 that supports a body of pyrotechnic material. The initiator assembly 54 also includes an initiator support 60. The initiator support 60 receives the initiator 56 and is connectable with the end cap 52 in order to thereby connect the initiator to the end cap. The initiator support 60 can have various configurations and constructions. For instance, the initiator support 60 can be constructed of metal, in which case the initiator 56 can be secured to the support via a crimped connection. Alternatively, the initiator support 60 can be constructed of molded plastic, and the initiator 56 can be connected to the support via a snap-fit or by insert molding the support around at least a portion of the initiator.

The initiator 56 includes pins 58 for providing an electrical connection with vehicle wiring through which a controller (not shown) can actuate the initiator in order to actuate the primary stage 50 of the inflator 40. To facilitate this connection, the initiator assembly 54 can also include an electrical connector portion 62 that engages a mating electrical connector associated with the vehicle wiring. The electrical connector portion 62 can, for example, be constructed of molded plastic that is secured to the initiator support 60 via a snap fit. In doing so, the electrical connector portion 62 guides female connectors of the mating connector over the male pins 58 of the initiator 56.

The secondary end cap 102 includes a central opening that supports an initiator assembly 104 that can be similar or identical to the initiator assembly 54 of the primary end cap 52. The initiator assembly 104 includes an initiator 106 that supports a body of pyrotechnic material. The initiator assembly 104 also includes an initiator support 110. The initiator support 110 receives the initiator 106 and is connectable with the end cap 102 in order to thereby connect the initiator to the end cap. The initiator support 110 can have various configurations and constructions. For instance, the initiator support 110 can be constructed of metal, in which case the initiator 106 can be secured to the support via a crimped connection. Alternatively, the initiator support 110 can be constructed of molded plastic, and the initiator 106 can be connected to the support via a snap-fit or by insert molding the support around at least a portion of the initiator.

The initiator 106 includes pins 108 for providing an electrical connection with vehicle wiring through which a controller (not shown) can actuate the initiator in order to actuate the primary stage 50 of the inflator 40. To facilitate this connection, the initiator assembly 104 can also include an electrical connector portion 112 that engages a mating electrical connector associated with the vehicle wiring. The electrical connector portion 112 can, for example, be constructed of molded plastic that is secured to the initiator support 110 via a snap fit. In doing so, the electrical connector portion 112 guides female connectors of the mating connector over the male pins 108 of the initiator 106.

The inflator also includes a primary filter assembly 70 and a secondary filter assembly 120. The filter disc assemblies 70, 120 help divide the chamber 44 into a primary chamber 64, a secondary chamber 114, and a filter chamber 150. In practice, the primary chamber 64 is adapted to hold a volume of primary gas generating material, such as solid propellant tablets 66, that are ignitable to produce a primary volume of inflation fluid. The secondary chamber 114 is adapted to hold a volume of secondary gas generating material, such as solid propellant tablets 116, that are ignitable to produce a secondary volume of inflation fluid.

The primary filter assembly 70 includes a primary filter disc 72 and a foil seal 74 that is secured to the filter disc by means, such as an adhesive. The primary filter disc 72 is constructed of a generally strong metal, such as steel or copper, and is secured to the side wall 42 by means, such as welding. The primary filter disc 72 has a generally disc-shaped configuration with a diameter selected to match that of the inside diameter of the side wall 42. The primary filter disc 72 has one or more openings 76 that extend through the thickness of the disc and can provide fluid communication between the primary chamber 64 and the filter chamber 150. In the non-actuated condition of the inflator 40 illustrated in FIG. 1, the foil seal 74 blocks fluid communication between the primary chamber 64 and the filter chamber 150 via the openings 76.

The secondary filter assembly 120 includes a secondary filter disc 122 and a foil seal 124 that is secured to the filter disc by means, such as an adhesive. The secondary filter disc 122 is constructed of a generally strong metal, such as steel or copper, and is secured to the side wall 42 by means, such as welding. The secondary filter disc 122 has a generally disc-shaped configuration with a diameter selected to match that of the inside diameter of the side wall 42. The secondary filter disc 122 has one or more openings 126 that extend through the thickness of the disc and can provide fluid communication between the secondary chamber 114 and the filter chamber 150. In the non-actuated condition of the inflator 40 illustrated in FIG. 1, the foil seal 124 blocks fluid communication between the secondary chamber 114 and the filter chamber 150 via the openings 126.

The inflator 40 includes one or more outlet openings 46 through which inflation fluid is discharged when the inflator is actuated. The outlet openings 46 extend through the side wall 42 in the section of the side wall that extends between the primary and secondary filter disc assemblies 70, 120. The outlet openings 46 therefore provide fluid communication between the filter chamber 150 and the exterior of the inflator 40. In the filter chamber 150, the inflator 40 includes a filter 152 that helps filter and cool the inflation fluid discharged from the inflator. The filter 152 may, for example, comprise a wire mesh material that provides a tortuous path through which the inflation fluid must pass in order to exit the inflator 40 and also acts as a heat sink for removing heat from the inflation fluid as it passes through the filter material.

According to the invention, the inflator 40 also includes a flow control disc 130 for helping to control the flow of inflation fluid within and through the inflator 40. In the embodiment illustrated in FIG. 1, the flow control disc 130 is a component of the secondary filter assembly 120. The flow control disc 130 acts with the secondary filter disc 122 to provide a unidirectional separator between the secondary stage 100/secondary propellant chamber 114 and the filter chamber 150. Referring to FIG. 2C, the flow control disc 130 has a generally circular configuration, with a flat, planar central portion 132 and a toroidal or outer portion 134 that encircles the central portion about the axis 148. The outer portion 134 of the flow control disc 130 may terminate in an out-turned peripheral portion 136 radially outside the outer portion.

The central portion 132 of the flow control disc 130 is secured to the secondary filter disc 122 by means, such as welding or an adhesive, on the surface of the secondary filter disc that is presented toward the filter chamber 150. The outer portion 134 of the flow control disc 130, including the peripheral portion 136, can be free from direct connection to the secondary filter disc 122, or can be releasably connected to the secondary filter disc by means, such as a sealant or glue, that can rupture easily when the inflator 40 is actuated. The diameter of the outer portion 134 of the flow control disc 130 is selected to coincide with the diameter of the circular pattern 140 along which the openings 126 in the secondary filter disc 122 are arranged about the axis 148. In this manner, the torroidal outer portion 134 forms a domed space 138 (see, especially, FIG. 1 viewing the space in section) that covers openings 126.

Upon sensing the occurrence of an event for which inflation of the protection device associated with the inflator 40 is desired, a sensor (not shown) provides an actuation signal to the inflator 40. Upon actuation, the inflator 40 discharges inflation through the outlet openings 46 into the protection device either directly or through a conduit such as a fill tube. The protection device inflates and deploys from a stored condition to an inflated and deployed condition in which the protection device can help protect the vehicle occupant(s).

Depending on sensed conditions at the time of actuation, the actuation signal can actuate the primary stage 50 alone, or both the primary stage and the secondary stage 100. Typically, the primary stage 50 is actuated in any event where inflation of the protection device is desired. Whether or not the secondary stage 100 is actuated depends on the conditions sensed at the time of inflation. These sensed conditions can include, for example, whether or not the vehicle seatbelts are latched, seatbelt tension, whether or not the presence of an occupant is detected on the vehicle seat, the forward/rearward position of the vehicle seat, and the inclined/reclined position of the vehicle seat. Other conditions can include sensed occupant position, vehicle speed, crash severity, and rollover detection.

Referring to FIG. 2A, in the event that only the primary stage 50 is actuated, ignition of the primary propellant 66 ruptures the foil 74 and the primary inflation fluid enters the filter chamber 150 via the openings 76. The primary inflation fluid passes through the filter 152 and exits the inflator 40 through the discharge openings 46.

According to the invention, when the primary stage 50 alone is actuated, the flow control disc 130 maintains a closed condition in which it acts to prevent combustion products from entering into the secondary stage 100 from the filter chamber 150 and coming into contact with the secondary propellant 116. The outer portion 134 of the flow control disc 130 covers the openings 126 in the secondary filter disc 122. When the primary stage 50 is actuated, fluid pressure in the primary chamber 64 builds, rupturing the foil 74 and allowing the inflation fluid and any other combustion products to enter the filter chamber 150 through the openings 76.

As a result, fluid pressure in the filter chamber 150 builds rapidly and acts on the flow control disc 130. Due to the flow control disc being positioned on the filter chamber-facing side of the secondary filter disc 122, the fluid pressure acting on the outer portion 134 of the flow control disc 130 (indicated generally by the small arrows in FIG. 2A) urges the outer portion toward the secondary filter disc so that the outer periphery 136 engages the disc. This engagement forms an effective seal that blocks passage of combustion products through the openings 126 of the secondary filter disc 122 and into contact with the secondary propellant 116 in the secondary combustion chamber 114.

Figure 2B:
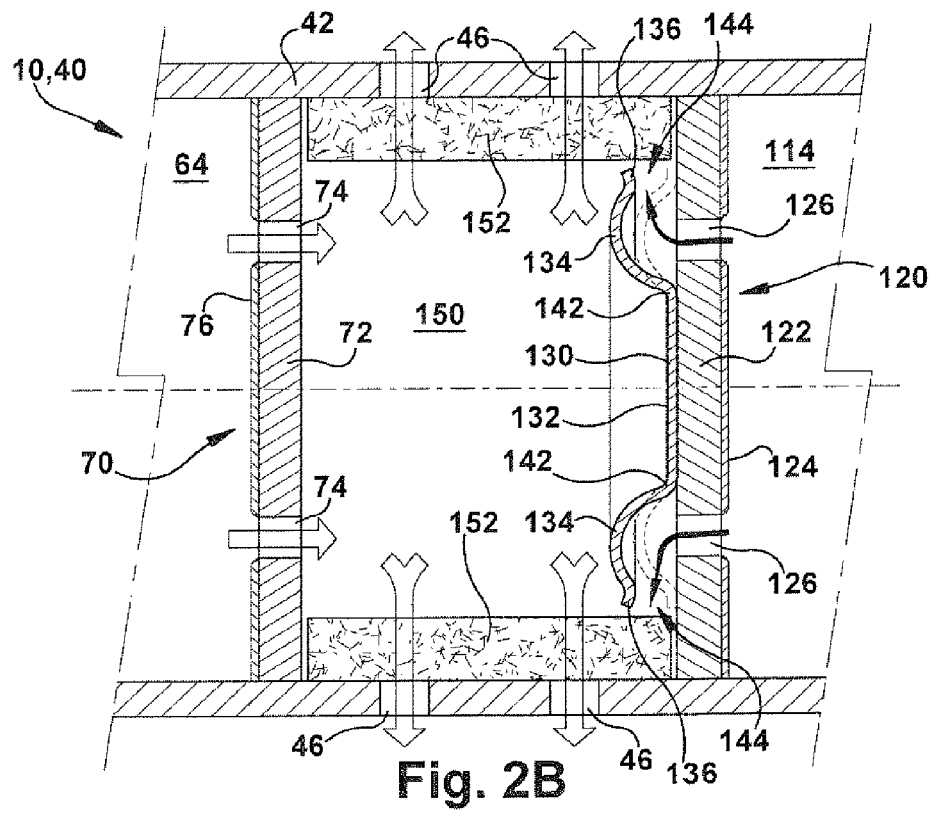
FIG. 2B is a sectional view illustrating the portion of the inflator of FIG. 2A in an actuated condition.

Referring to FIG. 2B, in the event that both the primary stage 50 and the secondary stage 100 are actuated, both stages produce inflation fluid that enters the filter chamber 150. Ignition of the primary propellant 66 ruptures the foil 74 and the primary inflation fluid enters the filter chamber 150 via the openings 76. Ignition of the secondary propellant 116 ruptures the foil 124 and the primary inflation fluid enters the filter chamber 150 via the openings 126. The primary and secondary inflation fluids mix in the filter chamber 150, pass through the filter 152, and exit the inflator 40 through the discharge openings 46.

According to the invention, when the primary stage 50 and secondary stage 100 are both actuated, the flow control disc 130 is placed in an open condition that permits the inflation fluid produced by the secondary propellant 116 to enter the filter chamber 150. The flow control disc 130 is placed in the open condition due to the fluid pressure in the secondary chamber 114 caused by the combustion of the secondary propellant 116. This fluid pressure acts on the outer portion 134 of the flow control disc 130, which causes at least one of deformation, displacement, and deflection, e.g., bending, of the disc generally along or about a circular bend line 142 defined at the interface between the disc-shaped center portion 132 and the toroidal outer portion 134. This deformation, displacement, or deflection creates an opening 144 that extends circumferentially generally about the periphery of the flow control disc 130. The secondary inflation fluid exits the secondary propellant chamber 114 via this opening 144.

Accordingly, the flow control disc 130 blocks combustion products of the primary stage 50 from entering the propellant chamber 114 of the secondary stage 100 from the filter chamber 150 in the event that the primary stage is actuated alone. The flow control disc 130 also permits inflation fluid generated by the secondary propellant 116 to enter the filter chamber 150 in the event that both the primary and secondary stages 50, 100 are actuated. Advantageously, the flow control disc 130 allows the inflator 40 to have a two-stage configuration in which both stages share the same filter chamber 150 and filter 152.

Those skilled in the art will appreciate that the configuration of apparatus 10, particularly the flow control disc 130 of the inflator 40, could have alternative configurations that, while differing in form or structure, could maintain the ability to perform in the advantageous manner described above. FIGS. 3A and 3B illustrate one such alternative configuration of the apparatus. In this description of the apparatus illustrated in FIGS. 3A-3B, reference numbers identifying components similar or identical to those described with regard to the apparatus of FIGS. 1-2C are given identical reference numbers, with the suffix "a" added for clarity.

Figure 1:
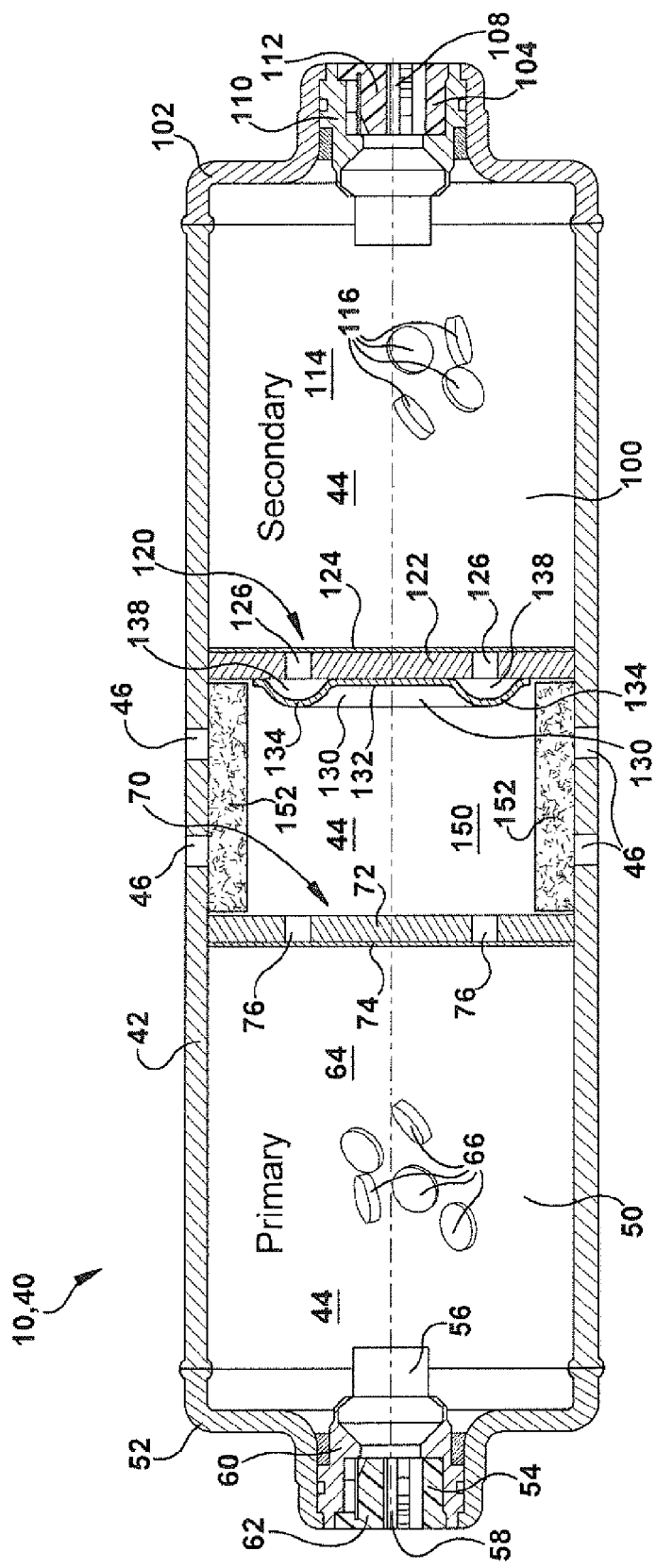
FIG. 1 illustrates an apparatus for helping to protect an occupant of a vehicle, according the invention.
Figure 2C:
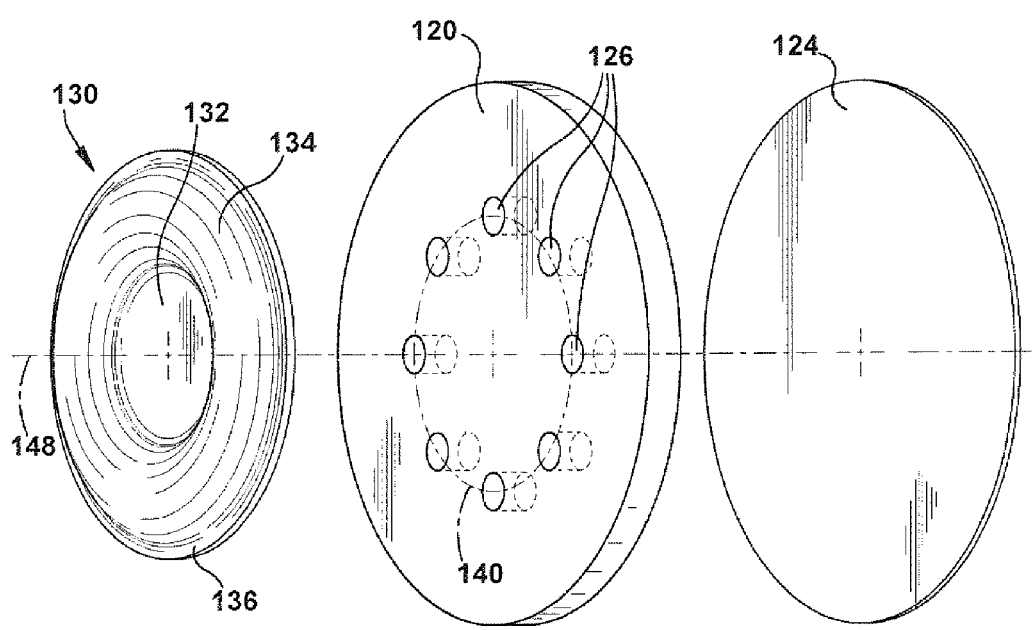
FIG. 2C is an exploded perspective view of a portion of the inflator of FIGS. 2A and 2B.
Figure 3A:
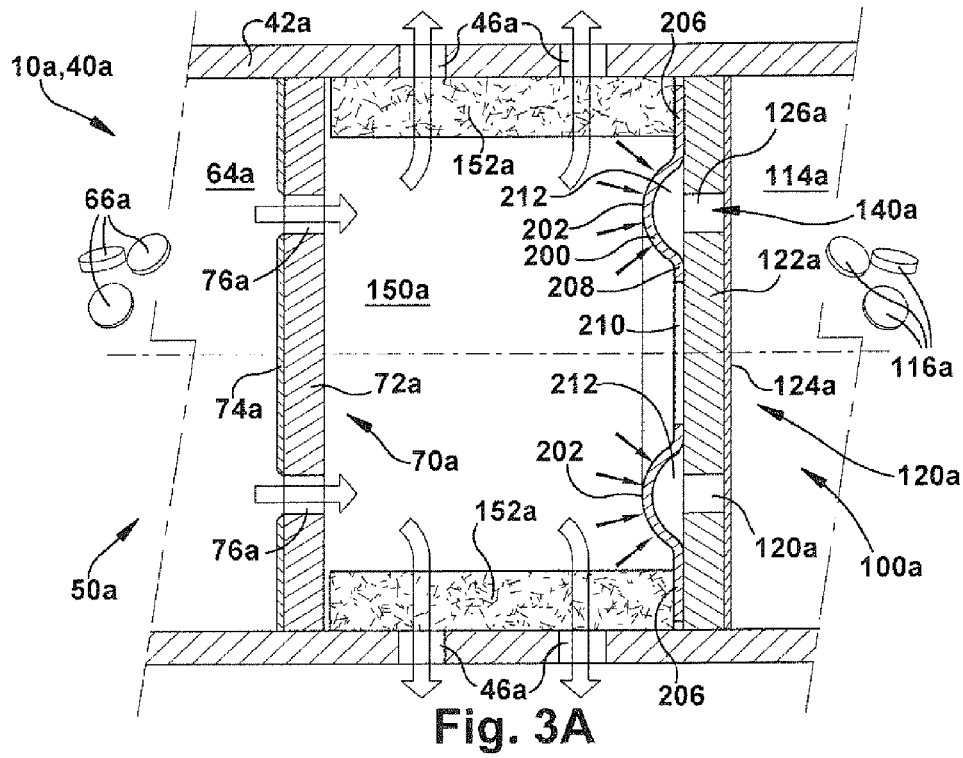
FIG. 3A is a sectional view illustrating a portion of an inflator in a non-actuated condition, according to a second embodiment of the invention.
Figure 3B:
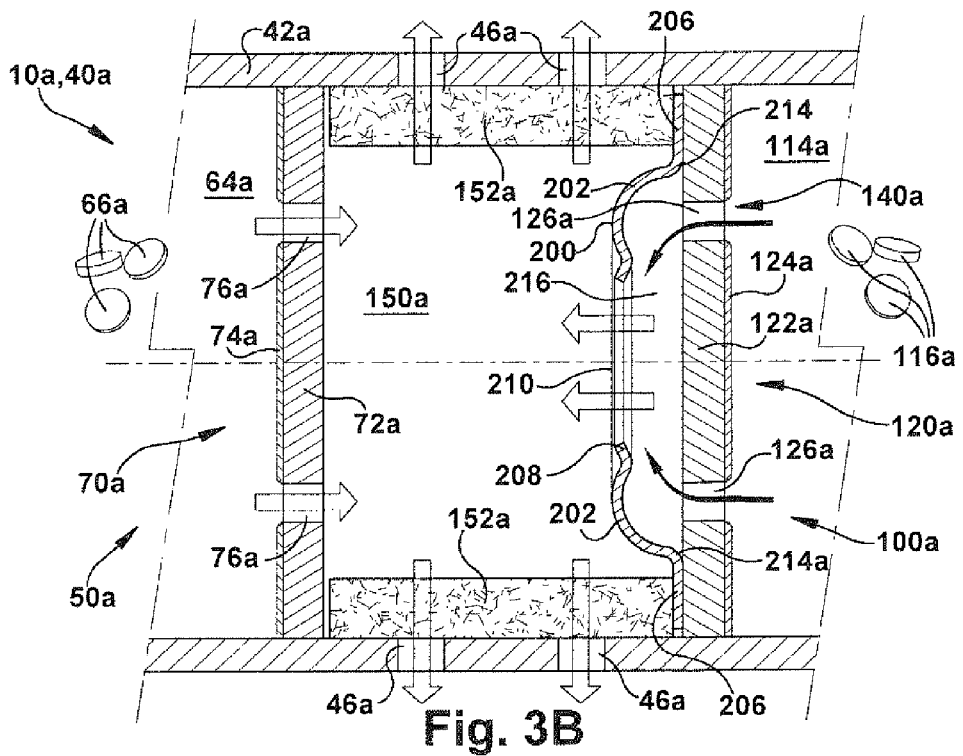
FIG. 3B is a sectional view illustrating the portion of the inflator of FIG. 3A in an actuated condition.

Referring to FIGS. 3A and 3B, the apparatus 10a includes an inflator 40a that, with the exception of the construction of the secondary filter assembly 120a (specifically, the flow control disc), is identical or substantially identical to the construction of the inflator 40 of the embodiment of FIGS. 1-2C. The inflator 40a thus includes a generally cylindrical side wall 42a that helps define a primary stage 50a with a primary propellant chamber 64a, a secondary stage 100a with a secondary propellant chamber 114a, and a filter chamber 150a defined between the primary and secondary chambers. Primary and secondary filter disc assemblies 70a, 120a, respectively, also help define the stages 50a, 100a, and chambers 64a, 114a, and 150a.

In the embodiment illustrated in FIGS. 3A-3B, the flow control disc 200, while formed as a portion of the secondary filter assembly 120a, has a configuration that differs from that of the embodiment illustrated in FIGS. 1-2C. Referring to FIGS. 3A-3B, the flow control disc 200 has a generally circular configuration, with toroidal or outer portion 202 that encircles a central portion 204. The central portion 204 of the flow control disc 200 includes a central peripheral portion 208 that defines a central opening 210. The outer portion 202 of the flow control disc 200 may terminate in an out-turned peripheral portion 206 radially outside the outer portion.

In the embodiment of FIGS. 3A-3B, the outer portion 206 of the flow control disc 200 is secured to the secondary filter disc 122a by means, such as welding or an adhesive, on the surface of the secondary filter disc that is presented toward the filter chamber 150a. The central portion 204, more particularly the central peripheral portion 208, can be free from direct connection to the secondary filter disc 122a or can be releasably connected to the secondary filter disc by means, such as a sealant or glue, that can rupture easily when the inflator 40a is actuated. The diameter of the outer portion 206 of the flow control disc 200 is selected to coincide with the diameter of the circular pattern 140a along which the openings 126a in the secondary filter disc 122a are arranged. In this manner, the torroidal outer portion 202 forms a domed space 212 (see FIG. 3A) that covers openings 126a.

Upon sensing the occurrence of an event for which inflation of the protection device associated with the inflator 40a is desired, a sensor (not shown) provides an actuation signal to the inflator 40a. Upon actuation, the inflator 40a discharges inflation through the outlet openings 46a into the protection device either directly or through a conduit such as a fill tube. The protection device inflates and deploys from a stored condition to an inflated and deployed condition in which the protection device can help protect the vehicle occupant(s).

Depending on sensed conditions at the time of actuation, the actuation signal can actuate the primary stage 50a alone, or both the primary stage and the secondary stage 100a. Typically, the primary stage 50a is actuated in any event where inflation of the protection device is desired. Whether or not the secondary stage 100a is actuated depends on the conditions sensed at the time of inflation. These sensed conditions can include, for example, whether or not the vehicle seatbelts are latched, seatbelt tension, whether or not the presence of an occupant is detected on the vehicle seat, the forward/rearward position of the vehicle seat, and the inclined/reclined position of the vehicle seat. Other conditions can include sensed occupant position, vehicle speed, crash severity, and rollover detection.

Referring to FIG. 3A, in the event that only the primary stage 50a is actuated, ignition of the primary propellant 66a ruptures the foil 74a and the primary inflation fluid enters the filter chamber 150a via the openings 76a. The primary inflation fluid passes through the filter 152a and exits the inflator 40a through the discharge openings 46a.

According to the invention, when the primary stage 50a alone is actuated, the flow control disc 200 maintains a closed condition in which it acts to prevent combustion products from entering into the secondary stage 100a from the filter chamber 150a and coming into contact with the secondary propellant 116a. The outer portion 202 of the flow control disc 200 covers the openings 126a in the secondary filter disc 122a. When the primary stage 50a is actuated, fluid pressure in the primary chamber 64a builds, rupturing the foil 74a and allowing the inflation fluid and any other combustion products to enter the filter chamber 150a through the openings 76a.

As a result, fluid pressure in the filter chamber 150a builds rapidly and acts on the flow control disc 200. Due to the flow control disc 200 being positioned on the filter chamber-facing side of the secondary filter disc 122a, the fluid pressure acting on the outer portion 202 of the flow control disc 200 (indicated generally by the small arrows in FIG. 3A) urges the outer portion toward the secondary filter disc so that the central peripheral portion 208 engages the disc. This engagement forms an effective seal that blocks passage of combustion products through the openings 126a of the secondary filter disc 122a and into contact with the secondary propellant 116a in the secondary combustion chamber 114a.

Referring to FIG. 3B, in the event that both the primary stage 50a and the secondary stage 100a are actuated, both stages produce inflation fluid that enters the filter chamber 150a. Ignition of the primary propellant 66a ruptures the foil 74a and the primary inflation fluid enters the filter chamber 150a via the openings 76a. Ignition of the secondary propellant 116a ruptures the foil 124a and the primary inflation fluid enters the filter chamber 150a via the openings 126a. The primary and secondary inflation fluids mix in the filter chamber 150a, pass through the filter 152a, and exit the inflator 40a through the discharge openings 46a.

According to the invention, when the primary stage 50a and secondary stage 100a are both actuated, the flow control disc 200 is placed in an open condition that permits the inflation fluid produced by the secondary propellant 116a to enter the filter chamber 150a. The flow control disc 200 is placed in the open condition due to the fluid pressure in the secondary chamber 114a caused by the combustion of the secondary propellant 116a. This fluid pressure in the domed space 212 acts on the torroidal outer portion 202 of the flow control disc 200, which causes at least one of deformation, displacement, and deflection, e.g., bending, of the disc generally along or about a circular bend line 214 defined at the interface between the outer peripheral portion 206 and the torroidal outer portion 202. This deformation, displacement, or deflection creates an opening 216 that extends circumferentially about the central opening 210 of the flow control disc 200. The secondary inflation fluid exits the secondary propellant chamber 114a via this opening 216.

Accordingly, the flow control disc 200 blocks combustion products of the primary stage 50a from entering the propellant chamber 114a of the secondary stage 100a from the filter chamber 150a in the event that the primary stage is actuated alone. The flow control disc 200 also permits inflation fluid generated by the secondary propellant 116a to enter the filter chamber 150a in the event that both the primary and secondary stages 50a, 100a are actuated. Advantageously, the flow control disc 200 allows the inflator 40a to have a two-stage configuration in which both stages share the same filter chamber 150a and filter 152a.

Figure 4A:
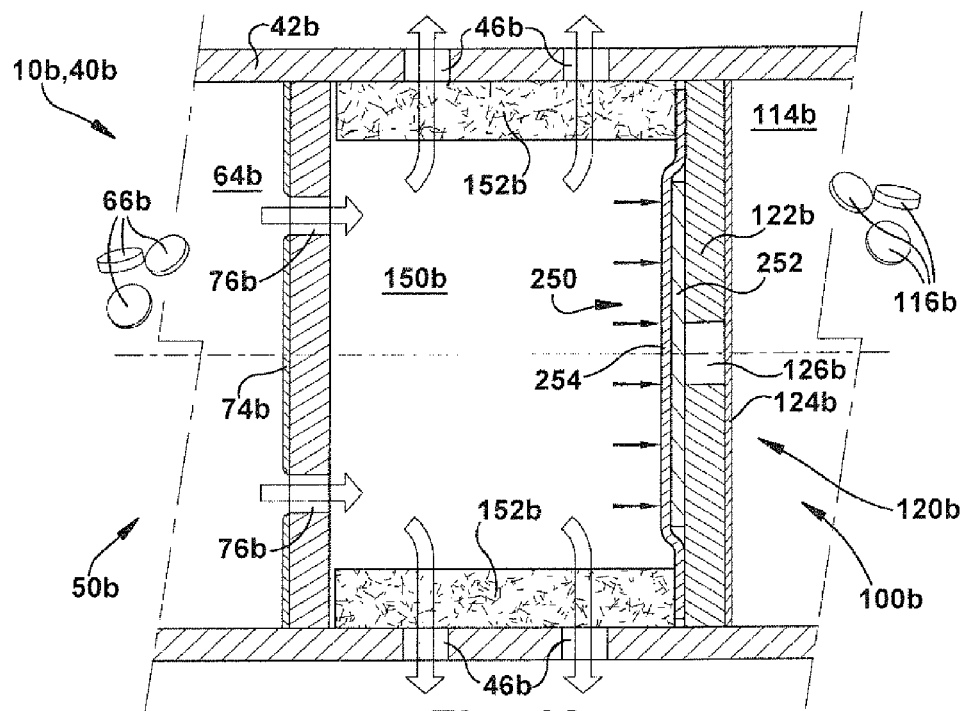
FIG. 4A is a sectional view illustrating a portion of an inflator in a non-actuated condition, according to a third embodiment of the invention.
Figure 4B:
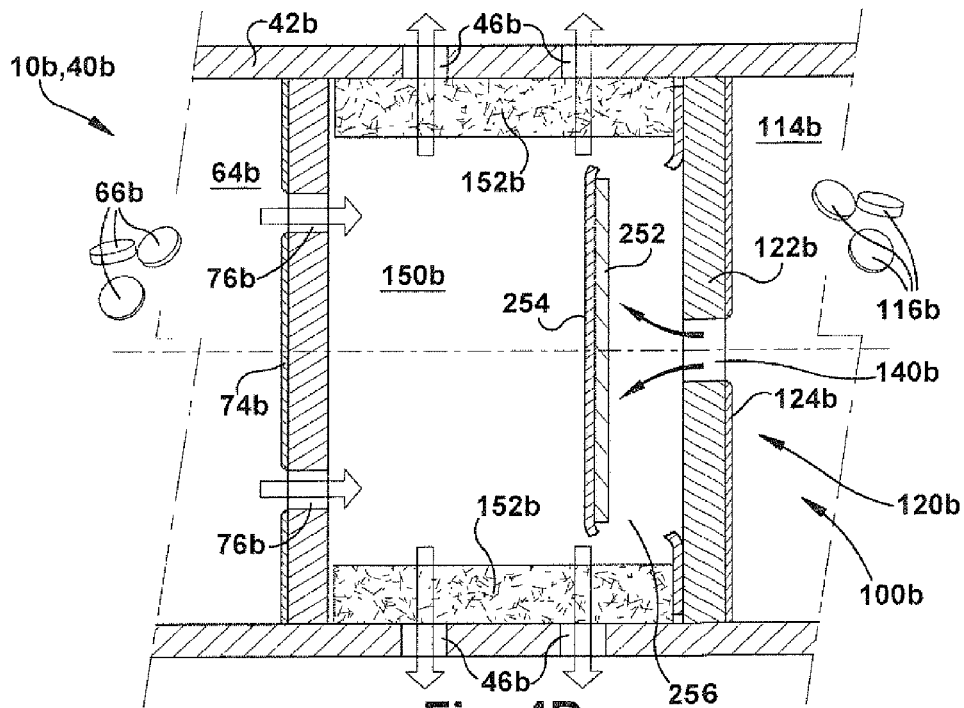
FIG. 4B is a sectional view illustrating the portion of the inflator of FIG. 3A in an actuated condition.

FIGS. 4A and 4B illustrate another alternative configuration of the apparatus. In this description of the apparatus illustrated in FIGS. 4A-4B, reference numbers identifying components similar or identical to those described with regard to the apparatus of FIGS. 1-2C are given identical reference numbers, with the suffix "b" added for clarity.

Referring to FIGS. 4A and 4B, the apparatus 10b includes an inflator 40b that, with the exception of the construction of the secondary filter assembly 120b (specifically, the flow control disc and the secondary filter disc), is identical or substantially identical to the construction of the inflator 40 of the embodiment of FIGS. 1-2C. The inflator 40b thus includes a generally cylindrical side wall 42b that helps define a primary stage 50b with a primary propellant chamber 64b, a secondary stage 100b with a secondary propellant chamber 114b, and a filter chamber 150b defined between the primary and secondary chambers. Primary and secondary filter disc assemblies 70b, 120b, respectively, also help define the stages 50b, 100b, and chambers 64b, 114b, and 150b.

In the embodiment illustrated in FIGS. 3A-3B, the flow control disc 250, while forming as a portion of the secondary filter assembly 120b, has a configuration that differs from that of the embodiment illustrated in FIGS. 1-2C. Referring to FIGS. 3A-3B, the flow control disc 250 includes a flat disc 252 and an adhesive 254 that overlies the flat disc and secures the flat disc to the secondary filter disc 122b. In this embodiment, the secondary filter disc 122b is illustrated having a single central opening 126b. The secondary filter disc 122b could, however have a greater number of openings 126b arranged in an alternative pattern. In this embodiment, the flat disc 252 is centered with the opening 126b along the inflator axis. The adhesive 254 can, for example, be a tape. Alternatively, the adhesive 254 for securing the flat disc 252 to the secondary filter disc 122b could be a glue or other adhesive substance.

Upon sensing the occurrence of an event for which inflation of the protection device associated with the inflator 40b is desired, a sensor (not shown) provides an actuation signal to the inflator 40b. Upon actuation, the inflator 40b discharges inflation through the outlet openings 46b into the protection device either directly or through a conduit such as a fill tube. The protection device inflates and deploys from a stored condition to an inflated and deployed condition in which the protection device can help protect the vehicle occupant(s).

Depending on sensed conditions at the time of actuation, the actuation signal can actuate the primary stage 50b alone, or both the primary stage and the secondary stage 100b. Typically, the primary stage 50b is actuated in any event where inflation of the protection device is desired. Whether or not the secondary stage 100b is actuated depends on the conditions sensed at the time of inflation. These sensed conditions can include, for example, whether or not the vehicle seatbelts are latched, seatbelt tension, whether or not the presence of an occupant is detected on the vehicle seat, the forward/rearward position of the vehicle seat, and the inclined/reclined position of the vehicle seat. Other conditions can include sensed occupant position, vehicle speed, crash severity, and rollover detection.

Referring to FIG. 4A, in the event that only the primary stage 50b is actuated, ignition of the primary propellant 66b ruptures the foil 74b and the primary inflation fluid enters the filter chamber 150b via the openings 76b. The primary inflation fluid passes through the filter 152b and exits the inflator 40b through the discharge openings 46b.

According to the invention, when the primary stage 50b alone is actuated, the flow control disc 200 maintains a closed condition in which it acts to prevent combustion products from entering into the secondary stage 100b from the filter chamber 150b and coming into contact with the secondary propellant 116b. The flat disc 252 of the flow control disc 250 covers the openings 126b in the secondary filter disc 122b. When the primary stage 50b is actuated, fluid pressure in the primary chamber 64b builds, rupturing the foil 74b and allowing the inflation fluid and any other combustion products to enter the filter chamber 150b through the openings 76b.

As a result, fluid pressure in the filter chamber 150b builds rapidly and acts on the flow control disc 250. Due to the flow control disc 250 being positioned on the filter chamber-facing side of the secondary filter disc 122b, the fluid pressure acting on the flat disc 252 (indicated generally by the small arrows in FIG. 4A) urges the flat disc against the secondary filter disc. This engagement forms an effective seal in which the flat disc 252 blocks passage of combustion products through the opening 126b of the secondary filter disc 122b and into contact with the secondary propellant 116b in the secondary combustion chamber 114b.

Referring to FIG. 4B, in the event that both the primary stage 50b and the secondary stage 100b are actuated, both stages produce inflation fluid that enters the filter chamber 150b. Ignition of the primary propellant 66b ruptures the foil 74b and the primary inflation fluid enters the filter chamber 150b via the openings 76b. Ignition of the secondary propellant 116b ruptures the foil 124b and the primary inflation fluid enters the filter chamber 150b via the openings 126b. The primary and secondary inflation fluids mix in the filter chamber 150b, pass through the filter 152b, and exit the inflator 40b through the discharge openings 46b.

According to the invention, when the primary stage 50b and secondary stage 100b are both actuated, the flow control disc 250 is placed in an open condition that permits the inflation fluid produced by the secondary propellant 116b to enter the filter chamber 150b. The flow control disc 250 is placed in the open condition due to the fluid pressure in the secondary chamber 114b caused by the combustion of the secondary propellant 116b. This fluid pressure acting on the flat disc 252 ruptures or otherwise breaks the bond with which the adhesive 254 connects the flat disc to the secondary filter disc 122b. This detachment permits at least one of a deformation, displacement, and deflection of the flow control disc 250 that creates an opening 256 through which the secondary inflation fluid can exit the secondary propellant chamber 114b.

Accordingly, the flow control disc 250 blocks combustion products of the primary stage 50b from entering the propellant chamber 114b of the secondary stage 100b from the filter chamber 150b in the event that the primary stage is actuated alone. The flow control disc 250 also permits inflation fluid generated by the secondary propellant 116b to enter the filter chamber 150b in the event that both the primary and secondary stages 50b, 100b are actuated. Advantageously, the flow control disc 250 allows the inflator 40b to have a two-stage configuration in which both stages share the same filter chamber 150b and filter 152b.

Figure 5A:
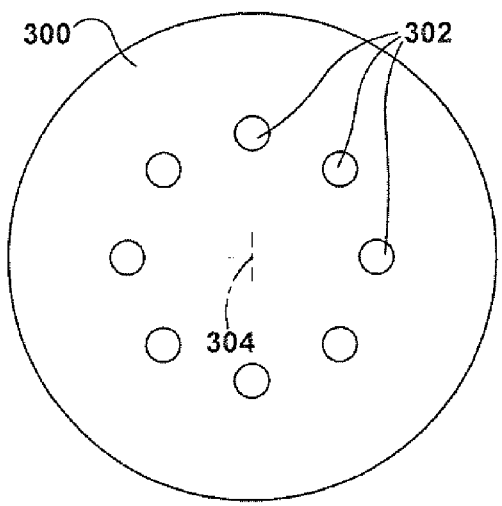
FIGS. 5A-5D are schematic plan views illustrating alternative configurations for a portion of the apparatus of FIGS. 1-4B.
Figure 5B:
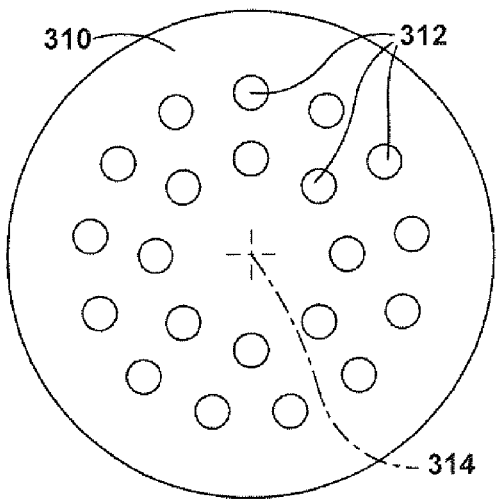
Figure 5C:
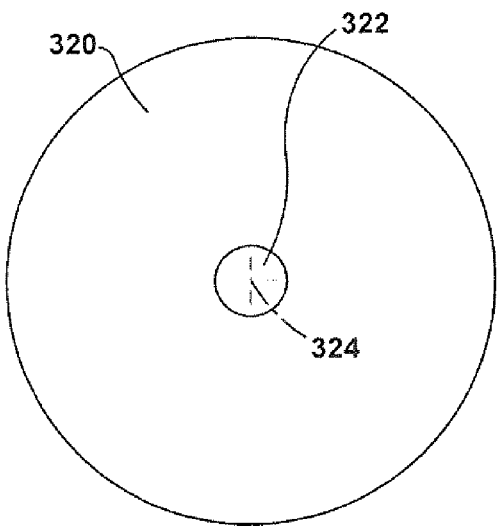

From the above, those skilled in the art will appreciate that the configuration of the flow control disc can depend at least in part on the configuration of the secondary filter disc. More specifically, the flow control disc must have a configuration that cooperates with the size, spacing, and arrangement of the openings in the secondary filter disc. FIGS. 5A-5C illustrate various possible configurations for the secondary filter disc. Referring to FIG. 5A, a secondary filter disc 300 has a configuration in which a plurality of openings 302 are spaced in a circular pattern about the center 304 of the disc. According to the invention, a flow control disc having a configuration of any of the embodiments illustrated herein (i.e., the embodiments of FIG. 2A-2B, 3A-3B, or 4A-4B) could be used in an inflator that incorporates the secondary filter disc of FIG. 5A. Adjustments to the dimensions of the torroidal outer portions of the flow control discs of FIGS. 2A-2B and 3A-3B may be necessary.

Referring to FIG. 5B, a secondary filter disc 310 has a configuration in which a plurality of openings 312 are spaced in a circular pattern in which two circular rows are arranged about the center 314 of the disc. According to the invention, a flow control disc having a configuration of any of the embodiments illustrated herein (i.e., the embodiments of FIG. 2A-2B, 3A-3B, or 4A-4B) could be used in an inflator that incorporates the secondary filter disc of FIG. 5B. Adjustments to the dimensions of the torroidal outer portions of the flow control discs of FIGS. 2A-2B and 3A-3B may be necessary.

Referring to FIG. 5C, a secondary filter disc 320 has a configuration in which a single opening 322 is positioned at the center 314 of the disc. According to the invention, a flow control disc having a configuration of the embodiment illustrated in FIGS. 4A-4B could be used in an inflator that incorporates the secondary filter disc of FIG. 5C.

Figure 5D:
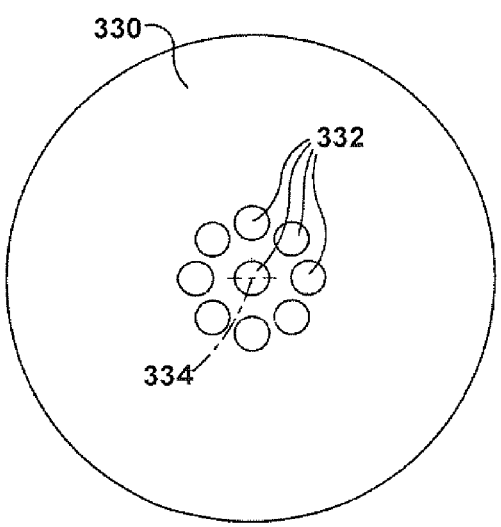

Referring to FIG. 5D, a secondary filter disc 330 has a configuration in which a plurality of openings 312 include a single opening positioned at the center 334 of the disc and a plurality of openings are spaced in a circular pattern about the center opening. According to the invention, a flow control disc having a configuration of the embodiment illustrated in FIGS. 4A-4B could be used in an inflator that incorporates the secondary filter disc of FIG. 5D.

From the above description of the invention, those skilled in the art will perceive applications, improvements, changes and modifications to the invention. Such applications, improvements, changes and modifications within the skill of the art are intended to be covered by the appended claims.

Having described the invention, we claim the following:

1. An inflator for inflating an inflatable vehicle occupant protection device, the inflator comprising:
   a primary stage actuatable to produce a primary flow of inflation fluid;
   secondary stage actuatable to produce a secondary flow of inflation fluid;
   a filter chamber into which the primary and secondary flows of inflation fluid are directed;
   a secondary filter assembly that permits the secondary flow of inflation fluid to flow into the filter chamber and blocks particulates from flowing from the filter chamber into the secondary stage; and
   a flow control disc positioned on a side of the secondary filter assembly that is presented toward the filter chamber, the flow control disc blocking combustion products produced by the primary stage from entering the secondary stage and allowing combustion products produced by the secondary stage to enter the filter chamber.

2. The inflator recited in claim 1, wherein the primary and secondary stages occupy portions of an inflator housing, the filter chamber being positioned between the primary and secondary stages, the secondary filter assembly defining the boundary between the secondary stage and the filter chamber.

3. The inflator recited in claim 1, wherein the inflator comprises a housing having a cylindrical outer wall extending along a central inflator axis, the primary stage occupying a first axial end portion of the housing, the secondary stage occupying an opposite second axial end portion of the housing, the filter chamber occupying the space that extends axially between the primary and secondary stages.

4. The inflator recited in claim 3, wherein the primary stage comprises a primary propellant chamber and the secondary stage comprises a secondary propellant chamber, the filter chamber being positioned between the primary and secondary propellant chambers, the secondary filter assembly separating the secondary propellant chamber from the filter chamber.

5. The inflator recited in claim 1, wherein the filter chamber comprises outlets through which the inflation fluid exits the inflator.

6. The inflator recited in claim 1, wherein the secondary filter assembly comprises a secondary filter disc and the flow control disc, the secondary filter disc defining the boundary between the secondary stage and the filter chamber and comprising one or more openings that provide fluid communication between the secondary stage and the filter chamber, the flow control disc blocking fluid communication between the filter chamber and the secondary stage through the openings in response to actuation of the primary stage, the flow control disc becoming at least one of deformed, displaced, and deflected in response to actuation of the secondary stage to establish fluid communication between the secondary stage and the filter chamber via the openings.

7. The inflator recited in claim 6, wherein the flow control disc has a generally circular configuration with a central portion and an outer portion that encircles the central portion, the outer portion being configured to coincide with the locations of the openings in the secondary filter disc.

8. The inflator recited in claim 7, wherein the outer portion has a domed torroidal configuration that forms a torroidal domed space that covers openings.

9. The inflator recited in claim 7, wherein the flow control disc is secured to the secondary filter disc on a surface of the flow control disc that is presented toward the filter chamber;
  wherein fluid pressure in the filter chamber resulting from actuation of the primary stage acts on the outer portion and urges the flow control disc against the secondary filter disc to block fluid communication between the secondary stage and the filter chamber; and
  wherein fluid pressure in the secondary stage resulting from actuation of the secondary stage acts on the outer portion through the openings in the secondary filter disc to at least one of deform, displace, and deflect the flow control disc to establish fluid communication between the secondary stage and the filter chamber.

10. The inflator recited in claim 9, wherein the central portion of the flow control disc is connected to the secondary filter disc, pressure resulting from actuation of the secondary stage acting on the outer portion through the openings in the secondary filter disc causing the flow control disc to become at least one of deformed, displaced, and deflected at the interface between the outer portion and the central portion of the flow control disc to establish an opening about the periphery of the flow control disc through which secondary inflation fluid can flow into the filter chamber.

11. The inflator recited in claim 9, wherein the central portion of the flow control disc includes an opening, and wherein the flow control disc further comprises a peripheral portion radially outside the outer portion that is connected to the secondary filter disc, pressure resulting from actuation of the secondary stage acting on the outer portion through the openings in the secondary filter disc causing the flow control disc to become at least one of deformed, displaced, and deflected at the interface between the outer portion and the peripheral portion of the flow control disc to move the central portion away from the secondary filter disc to thereby establish flow path through the openings in the secondary filter disc and the opening in the central portion of the flow control disc through which secondary inflation fluid can flow into the filter chamber.

12. The inflator recited in claim 6, wherein the flow control disc has a generally flat configuration and is secured to the secondary filter disc on a surface of the flow control disc that is presented toward the filter chamber;
  wherein fluid pressure in the filter chamber resulting from actuation of the primary stage acts on the flow control disc to maintain its connection to the secondary filter disc to block fluid communication between the secondary stage and the filter chamber; and
  wherein fluid pressure in the secondary stage resulting from actuation of the secondary stage acts on the flow control disc to break the connection of the flow control disc to the secondary filter disc to at least one of deform, displace, and deflect the flow control disc to establish fluid communication between the secondary stage and the filter chamber.

13. The inflator recited in claim 12, wherein the flow control disc is connected to the filter disc by tape, pressure resulting from actuation of the secondary stage acting on the flow control disc causing the tape to at least one of rupture and disconnect, thereby allowing the flow control disc to become displaced to unblock the openings in the secondary filter disc and permit secondary inflation fluid to flow through the openings in the secondary filter disc into the filter chamber.

14. A filter disc assembly for preventing products resulting from the ignition of a gas generating material of a primary stage of an inflator from entering a secondary stage of the inflator, the filter disc assembly comprising:
  a filter disc for being positioned between the primary stage and the secondary stage, the filter disc comprising one or more openings in fluid communication with the secondary stage and through which secondary inflation fluid products can flow upon actuation of the secondary stage; and
  a flow control disc positioned on a surface of the filter disc presented toward the primary stage and blocking fluid communication with the secondary stage through the openings in the filter disc,
  wherein primary inflation fluid resulting from actuation of the primary stage urges the flow control disc against the filter disc to maintain the blocking of fluid communication with the secondary stage through the openings in the filter disc, and
  wherein secondary inflation fluid resulting from actuation of the secondary stage acts on the flow control disc through the openings to at least one of deform, displace, and deflect the flow control disc to unblock the openings and permit the secondary inflation fluid to flow through the openings in the filter disc.

15. The filter disc assembly recited in claim 14, wherein the flow control disc has a generally circular configuration with a central portion and an outer portion that encircles the central portion, the outer portion being configured to coincide with the locations of the openings in the filter disc.

16. The filter disc assembly recited in claim 15, wherein the outer portion has a domed torroidal configuration that forms a torroidal domed space that covers openings.

17. The filter disc assembly recited in claim 15, wherein the flow control disc is secured to the filter disc;
  wherein fluid pressure resulting from actuation of the primary stage acts on the outer portion and urges the flow control disc against the filter disc to block fluid communication with the secondary stage via the openings in the filter disc; and
  wherein fluid pressure in the secondary stage resulting from actuation of the secondary stage acts on the outer portion through the openings in the filter disc to at least one of deform, displace, and deflect the flow control disc to unblock fluid communication with the secondary stage via the openings in the filter disc.

18. The filter disc assembly recited claim 17, wherein the central portion of the flow control disc is connected to the filter disc, pressure resulting from actuation of the secondary stage acting on the outer portion through the openings in the filter disc causing the flow control disc to become at least one of deformed, displaced, and deflected at the interface between the outer portion and the central portion of the flow control disc to establish an opening about the periphery of the flow control disc through which secondary inflation fluid can flow.

19. The filter disc assembly recited claim 17, wherein the central portion of the flow control disc includes an opening, and wherein the flow control disc further comprises a peripheral portion radially outside the outer portion that is connected to the filter disc, pressure resulting from actuation of the secondary stage acting on the outer portion through the openings in the filter disc causing the flow control disc to become at least one of deformed, displaced, and deflected at the interface between the outer portion and the peripheral portion of the flow control disc to move the central portion away from the filter disc to thereby establish flow path through the openings in the filter disc and the opening in the central portion of the flow control disc through which secondary inflation fluid can flow.

20. The filter disc assembly recited claim 14, wherein the flow control disc has a generally flat configuration, fluid pressure in the filter chamber resulting from actuation of the primary stage acting on the flow control disc to maintain its connection to the filter disc to block fluid communication with the secondary stage through the openings in the filter disc, fluid pressure in the secondary stage resulting from actuation of the secondary stage acting on the flow control disc to break the connection of the flow control disc to the filter disc to at least one of deform, displace, and deflect the flow control disc to establish fluid communication with the secondary stage through the openings in the filter disc.

21. The filter disc assembly recited in claim 20, wherein the flow control disc is connected to the filter disc by tape, pressure resulting from actuation of the secondary stage acting on the flow control disc causing the tape to at least one of rupture and disconnect, thereby allowing the flow control disc to become displaced to unblock the openings in the filter disc and permit secondary inflation fluid to flow through the openings in the filter disc.

\* \* \* \* \*